United States Patent
Kuo

(10) Patent No.: US 10,212,751 B2
(45) Date of Patent: Feb. 19, 2019

(54) METHOD OF CONFIGURING TRANSMISSION DATA STREAMS AND WIRELESS COMMUNICATION SYSTEM

(71) Applicant: MEDIATEK INC., Hsin-Chu (TW)

(72) Inventor: Ching-Yu Kuo, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 278 days.

(21) Appl. No.: 15/135,562

(22) Filed: Apr. 22, 2016

(65) Prior Publication Data

US 2016/0316510 A1 Oct. 27, 2016

Related U.S. Application Data

(60) Provisional application No. 62/151,070, filed on Apr. 22, 2015.

(51) Int. Cl.
*H04W 76/15* (2018.01)
*H04L 29/06* (2006.01)
*H04W 84/12* (2009.01)

(52) U.S. Cl.
CPC .............. *H04W 76/15* (2018.02); *H04L 69/14* (2013.01); *H04W 84/12* (2013.01)

(58) Field of Classification Search
CPC ........................... H04W 76/15; H04W 76/025
See application file for complete search history.

(56) References Cited

U.S. PATENT DOCUMENTS

2004/0136349 A1* 7/2004 Walton ................. H04B 7/0417
370/338
2012/0093039 A1* 4/2012 Rofougaran .............. H04J 1/00
370/278

* cited by examiner

*Primary Examiner* — Siming Liu
(74) *Attorney, Agent, or Firm* — Winston Hsu

(57) ABSTRACT

The present invention provides a method of configuring transmission data streams and a wireless communication system. A first wireless device of the wireless communication system determines a number of data streams for a second wireless device, under a condition that the first wireless device operates in a noncontiguous operation mode. Radio frequency (RF) units of the wireless devices are fully exploited, and the data rate between the first wireless device and the second wireless device is enhanced.

16 Claims, 5 Drawing Sheets

METHOD OF CONFIGURING TRANSMISSION DATA STREAMS AND WIRELESS COMMUNICATION SYSTEM

CROSS REFERENCE TO RELATED APPLICATIONS

This application claims the benefit of U.S. provisional application No. 62/151,070, filed on Apr. 22, 2015 and incorporated herein by reference.

BACKGROUND

The present invention relates to a method of configuring transmission data streams and a wireless communication system, and more particularly, to a method and a wireless communication system capable of determining a number of transmission data stream in a noncontiguous operation mode.

As a demand for wireless service increases, a data rate of a wireless device is required to be higher. The wireless device may include multiple antennas to provide multiple spatial data streams, so as to enhance the data rate. In addition, an operating bandwidth of the wireless device is expected to be wider as well. In reality, since the frequency spectrum is densely occupied, especially the Industrial Scientific Medical (ISM) spectrum, it is hard to obtain a contiguous and sufficiently wide bandwidth to enhance the data rate. Recently released wireless standard allows wireless devices to operate over two or more noncontiguous frequency bands. For example, a wireless device under IEEE 802.11ac is allowed to perform wireless transmission over two noncontiguous 80 MHz bands simultaneously, which is equivalent to a 160 MHz band, so as to widen an equivalent operation bandwidth and improve the data rate.

Nevertheless, performing wireless transmission over a plurality of noncontiguous frequency bands requires more radio frequency (RF) units, where each RF unit may include an antenna and a transmission/reception switch to selectively connect the antenna either to a transmission processing circuit or to a reception processing circuit, since the noncontiguous frequency bands have different central frequencies. Note that, multiple RF units/antennas included in the wireless device are originally intended for providing multiple spatial data streams in a first frequency band of the plurality of noncontiguous frequency bands. Utilizing the RF units to operate at different central frequencies would decrease a number of data streams in the first band.

For example, a first wireless device equipped with two RF units is capable of providing two spatial data streams in the first frequency band. When the first wireless device is configured to operate over the first frequency band and a second frequency band simultaneously, where the first frequency band and the second frequency band are noncontiguous, one RF unit is designated for one frequency band. Hence, in the first frequency band, the first wireless device is limited to provide only one data stream.

Under such a condition, when a second wireless device establishes a wireless connection with the first wireless device on the first frequency band, the first wireless device is clamped to provide only one data stream to the second wireless device in the first frequency band, even though the second wireless device is equipped with two or more RF units. That is, even though both the first and the second wireless device have spatial capability of providing multiple data streams transmission, there is still only one data stream transmitted between the first and the second wireless device in the first frequency band. Part of the RF units of the wireless devices are left unused, and the data rate enhancement brought by multiple input multiple output (MIMO) is limited.

Therefore, it is necessary to improve the prior art.

SUMMARY

It is therefore a primary objective of the present invention to provide method of configuring a number of antennas and a wireless device, to improve over disadvantages of the prior art.

An embodiment of the present invention discloses a method of configuring transmission data streams, utilized in a first wireless device within a wireless communication system. The wireless communication system operates at a plurality of frequency bands. The first wireless device comprises a plurality of radio frequency (RF) units. The method comprises obtaining a spatial capability of a second wireless device; determining a spatial capacity of a wireless connection between the first wireless device and the second wireless device according to the spatial capability; and transmitting a plurality of data streams to the second wireless device at a first frequency band of the plurality of frequency bands, wherein a number of the plurality of data streams is smaller than or equal to the spatial capacity.

An embodiment of the present invention further discloses a wireless communication system operating at a plurality of frequency bands. The wireless communication system comprises a first wireless device, comprising a plurality of radio frequency (RF) units; and a second wireless device, configured to establish a wireless connection with the first wireless device. The first wireless device determines a spatial capability of the second wireless device and determines a spatial capacity of the wireless connection according to the spatial capability of the second wireless device. The first wireless device transmits a plurality of data streams to the second wireless device at a first frequency band of the plurality of frequency bands, and a number of the plurality of data streams is smaller than or equal to the spatial capacity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
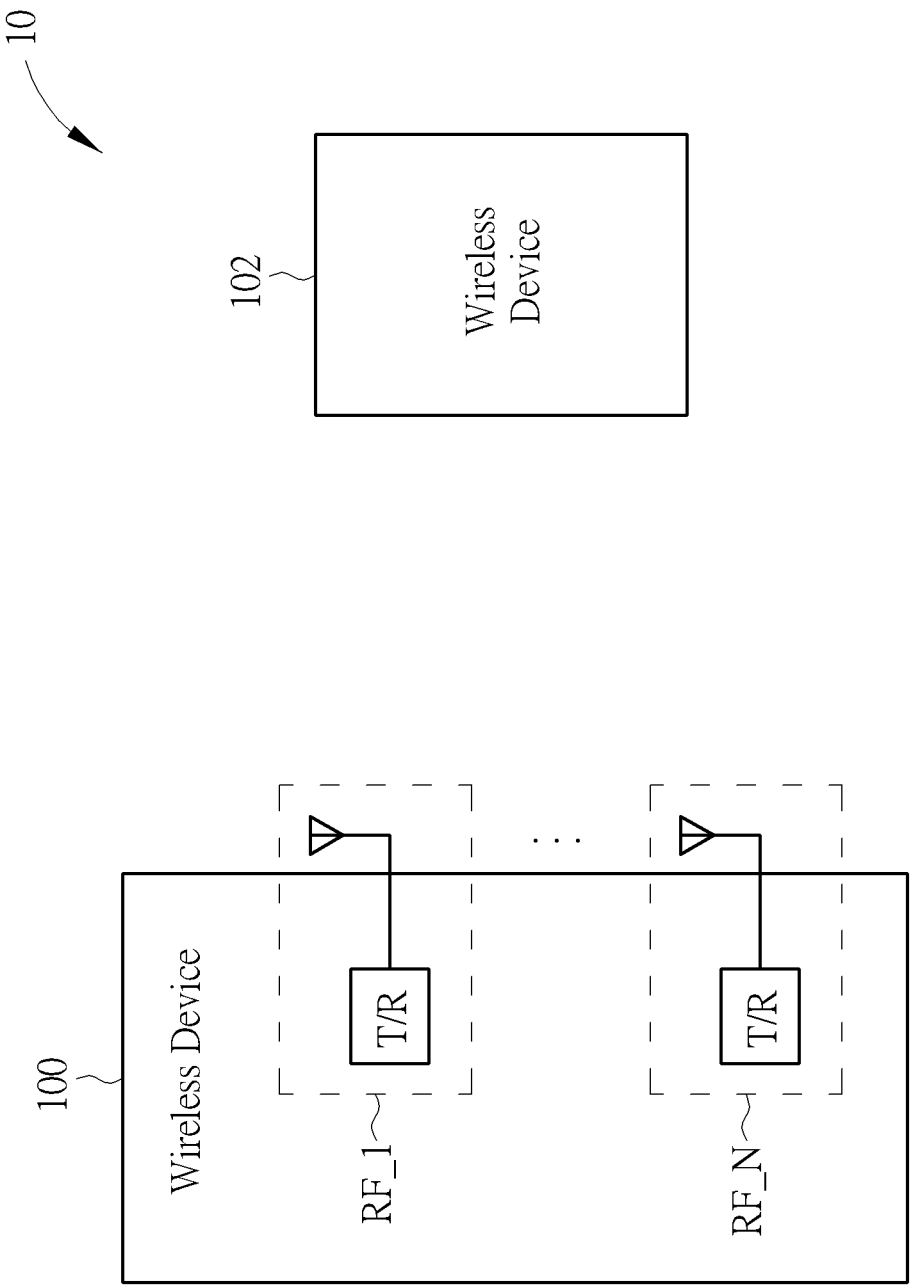
FIG. 1 is a schematic diagram of a wireless communication system according to an embodiment of the present invention.

Please refer to FIG. 1, which is a schematic diagram of a wireless communication system 10 according to an embodiment of the present invention. The wireless communication system 10 comprises a first wireless device 100 and a second wireless device 102. The first wireless device 100 and the second wireless device 102 may be mobile phones, tablet computers, access points or stations within a wireless local area network (WLAN). The first wireless device 100 comprises radio frequency (RF) units RF_1-RF_N. Each of the RF units RF_1-RF_N includes an antenna and a transmission/reception switch to selectively connect the antenna either to a transmission processing circuit or to a reception processing circuit of the wireless device 100.

Figure 2:
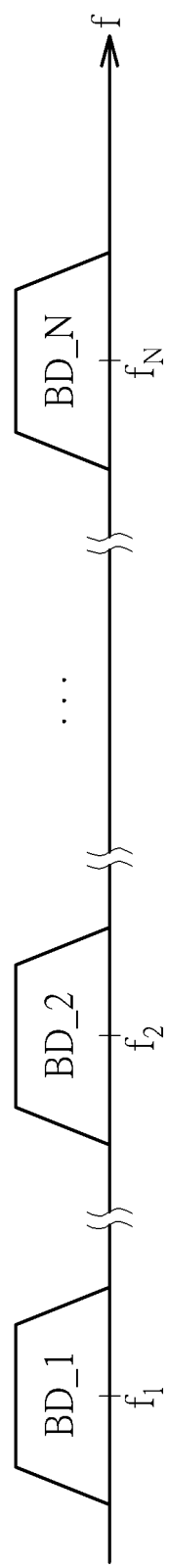
FIG. 2 is a schematic diagram of frequency spectrum.

The wireless communication system 10 is capable of simultaneously operating on a plurality of noncontiguous frequency bands BD_1-BD_N. Please refer to FIG. 2 to see a spectrum distribution of the noncontiguous frequency bands BD_1-BD_N. As FIG. 2 shows, central frequencies $f_1$-$f_N$ of the frequency bands BD_1-BD_N are sufficiently separated such that the frequency bands BD_1-BD_N are noncontiguous. When the first wireless device 100 is configured to operate in a noncontiguous operation mode, in which the first wireless device 100 operates over the noncontiguous frequency bands BD_1-BD_N. In an embodiment, the RF units RF_1-RF_N of the first wireless device 100 are designated to the frequency bands BD_1-BD_N, respectively. That is, an RF unit RF_1$x$ of the RF units RF_1-RF_N is designated to a frequency band BD_$x$ of the frequency bands BD_1-BD_N. Among the frequency bands BD_1-BD_N, control messages/information between the first wireless device 100 and the second wireless device 102 is transmitted within one of the frequency bands BD_1-BD_N, say, the frequency band BD_1. In other words, the frequency band BD_1 is regarded as a primary band of the wireless communication system 10. Packets transmitted on the primary frequency band contain control messages of the wireless communication system 10. Data payload, between the first wireless device 100 and the second wireless device 102, is transmitted on the rest of the frequency bands BD_1-BD_N.

When the first wireless device 100 is configured to operate in the noncontiguous operation mode and the second wireless device 102 attempts to establish a wireless connection with the first wireless device 100 on the primary frequency band BD_1, the first wireless device 100 may determine a number of spatial data streams transmitted on the primary frequency band BD_1 according to a spatial capability of the second wireless device 102, instead of transmitting only one data stream to the second wireless device 102. The spatial capability is a maximum number of data streams which the second wireless device 102 is capable to receive/successfully decode at one of the frequency bands BD_1-BD_N. For example, if the second wireless device 102 includes M antennas, the spatial capability of the second wireless device 102 is an integer M. In another perspective, the first wireless device 100 does not have to be restricted to transmit only one data stream on the primary frequency band BD_1, and has a flexibility of adjusting the number of spatial data streams transmitted on the primary frequency band BD_1, according to the spatial capability of the second wireless device 102.

Specifically, under the condition that the first wireless device 100 is configured to operate in the noncontiguous operation mode in which the RF units RF_1-RF_N of the first wireless device 100 are correspondingly designated to the frequency bands BD_1-BD_N, when the second wireless device 102 attempts to establish the wireless connection with the first wireless device 100 on the primary frequency band BD_1, in an embodiment, the second wireless device 102 may initiate a negotiation process with the first wireless device 100 in which the second wireless device 102 informs the first wireless device 100 about the spatial capability M of the second wireless device 102., i.e., the second wireless device 102 sends the spatial capability M of the second wireless device 102 to the first wireless device 100. In another embodiment of the present invention, the first wireless device 100 may by itself determine the spatial capability M of the second wireless device 102, i.e., the first wireless device 100 may determine the spatial capability M of the second wireless device 102 with its own approach. In short, the first wireless device 100 obtains the spatial capability M of the second wireless device 102.

After the first wireless device 100 receives the spatial capability M of the second wireless device 102, the first wireless device 100 would determine a spatial capacity SC of the wireless connection (between the first wireless device 100 and the second wireless device 102) on the primary frequency band BD_1 according to the spatial capability M and a number of the RF units RF_1-RF_N. Specifically, the first wireless device 100 determines the spatial capacity SC of the wireless connection as a minimum number of the spatial capability M of the second wireless device 102 and the number of the RF units RF_1-RF_N included in the first wireless device 100, i.e., SC=min (M,N).

After the first wireless device 100 determines the spatial capacity SC, the first wireless device 100 determines a number of data streams K and transmits K data streams to the second wireless device 102 on the primary frequency band BD_1, where the number of data streams K is greater than 1, and smaller than or equal to the spatial capacity SC. In other words, the first wireless device 100 re-designates apart of the RF units RF_1-RF_N (or all of the RF units RF_1-RF_N) to the primary frequency band BD_1, so as to transmit K data streams to the second wireless device 102 on the primary frequency band BD_1. Therefore, the first wireless device 100 has flexibility of adjusting the number of spatial data streams transmitted on the primary frequency band BD_1 to the second wireless device 102, and would not be restricted to transmit only one data stream one the primary frequency band BD_1.

Figure 3:
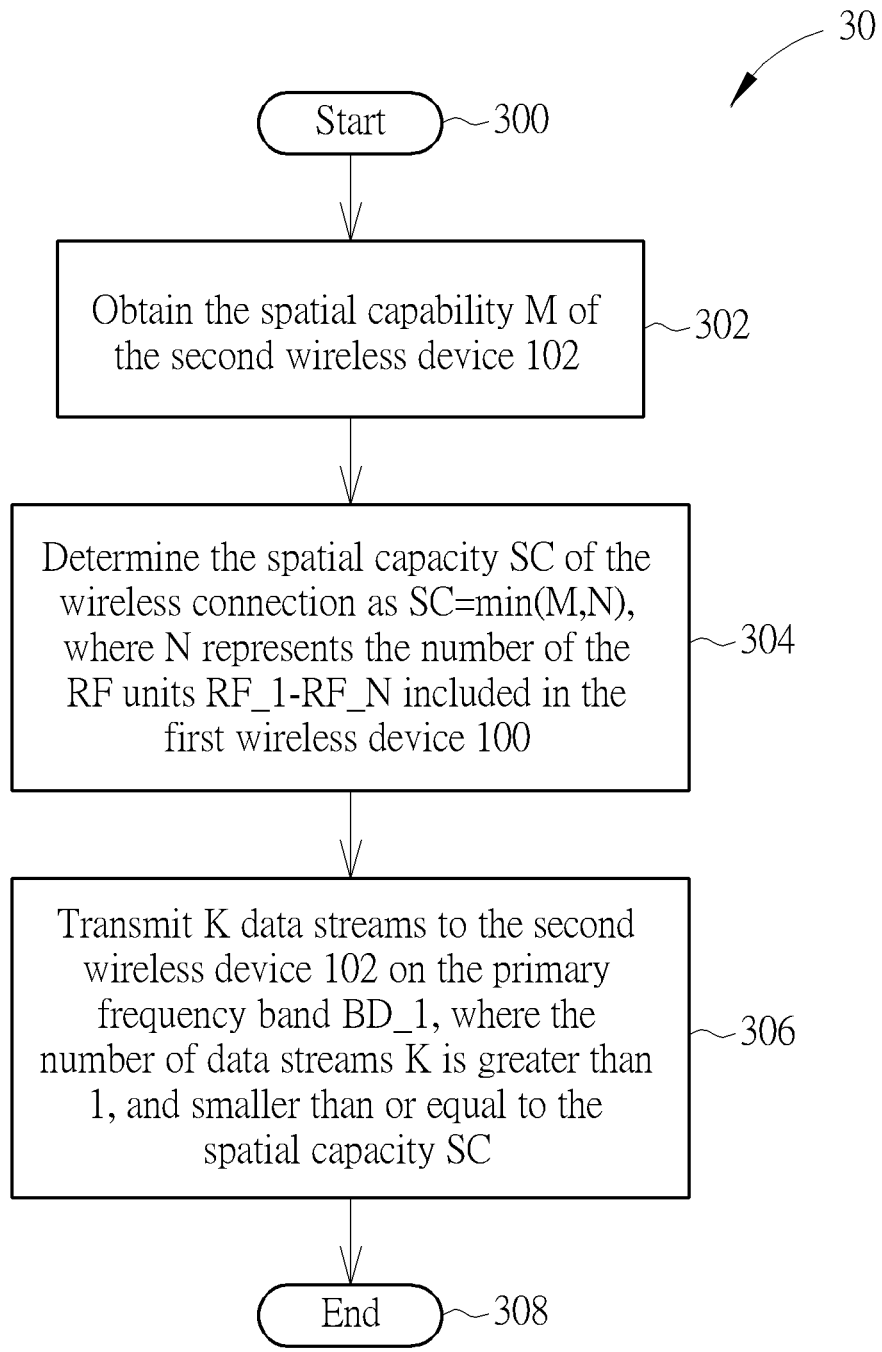
FIG. 3 is a schematic diagram of a configuring process according to an embodiment of the present invention.

Operations of the first wireless device 100 configuring number of transmission data streams may be further summarized into a configuring process 30. Please refer to FIG. 3, which is a schematic diagram of the configuring process 30 according to an embodiment of the present invention. The configuring process 30 is executed by the first wireless device 100. The configuring process 30 comprises the following steps:

Step 300: Start.
Step 302: Obtain the spatial capability M of the second wireless device 102.
Step 304: Determine the spatial capacity SC of the wireless connection as SC=min(M,N), where N represents the number of the RF units RF_1-RF_N included in the first wireless device 100.
Step 306: Transmit K data streams to the second wireless device 102 on the primary frequency band BD_1, where the number of data streams K is greater than 1, and smaller than or equal to the spatial capacity SC.
Step 308: End.

Details of the configuring process 30 may be referred to related paragraphs stated in the above, which is not narrated herein for brevity. Notably, if the wireless device 100 determines that the wireless device 102 is capable of receiving/successfully decoding more data streams, after executing the configuring process 30, the wireless device 100 may re-designates more RF unit to the primary frequency band BD_1, such that the number of data streams on the primary frequency band BD_1 is increased, compared to the number of data streams on the primary frequency band BD_1 in the noncontiguous operation mode.

In the prior art, when the first wireless device operates in the noncontiguous operation mode, the plurality of RF units of the first wireless device are designated to corresponding frequency bands, such that the first wireless device is restricted to transmit only one data stream at each frequency band, regardless the spatial capability of the second wireless device which attempts to build up the wireless connection with the first wireless device. Part of the RF units of the wireless devices are left unused, such that a data rate between the first wireless device and the second wireless device is limited. In comparison, according to the configuring process 30, the first wireless device may determine the number of data streams for the second wireless device, under the condition that the first wireless device operates in the noncontiguous operation mode. The RF units of the wireless devices are fully exploited, and the data rate between the first wireless device and the second wireless device is enhanced.

Figure 4:
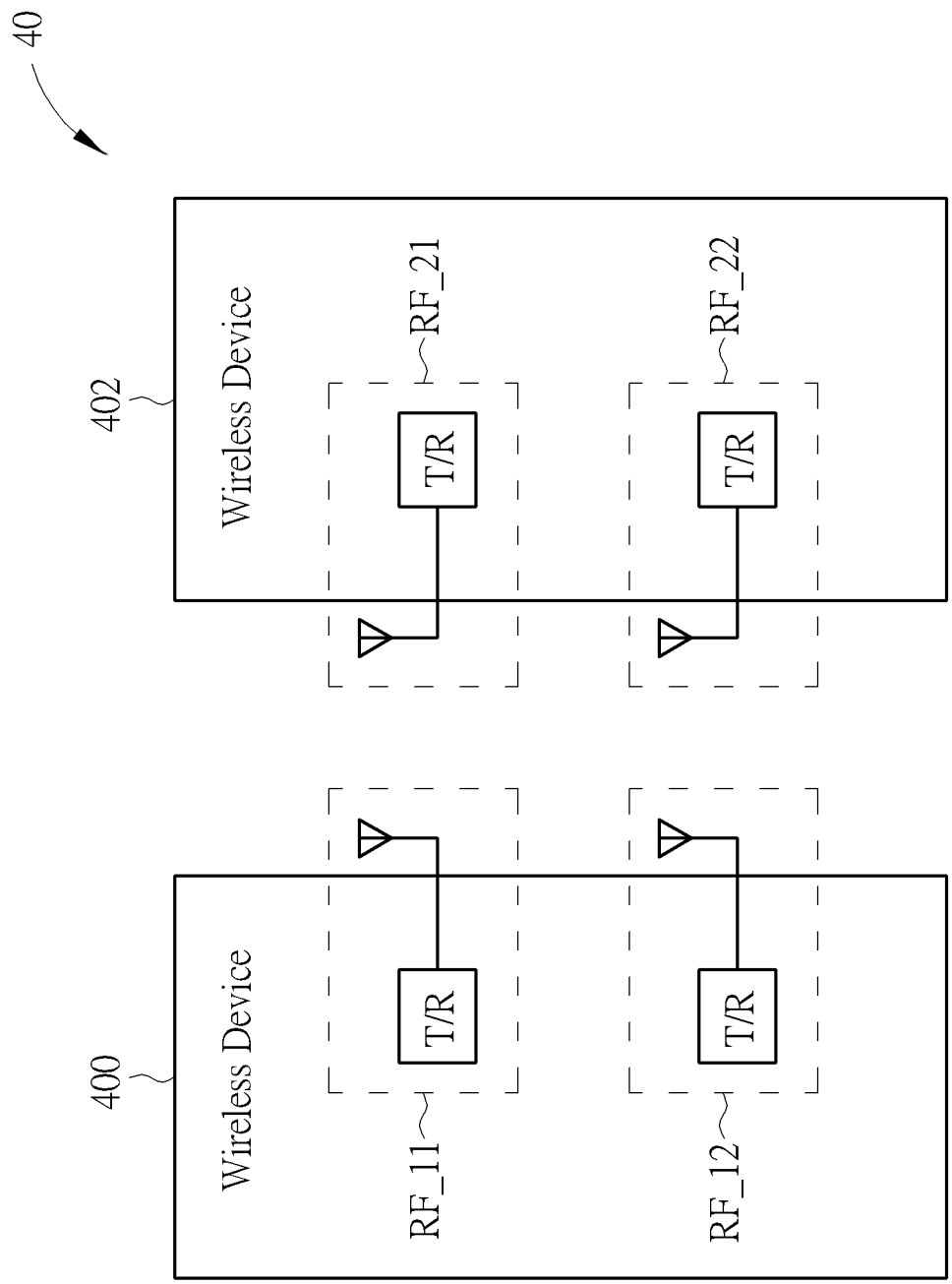
FIG. 4 is a schematic diagram of a wireless communication system according to an embodiment of the present invention.

Notably, the embodiments stated in the above are utilized for illustrating the concept of the present invention. Those skilled in the art may make modifications and alternations accordingly, and not limited herein. For example, the wireless communication system and the configuring process may be applied to wireless devices under a standard of IEEE 80211ac. Please refer to FIG. 4, which is a schematic diagram of a wireless communication system 40 according to an embodiment of the present invention. The wireless communication system 40 comprises a first wireless device 400 and a second wireless device 402. The wireless communication system 40, the first wireless device 400 and the second wireless device 402 are all complying with IEEE 802.11ac standard. The first wireless device 400, comprising two RF unit RF_11 and RF_12, is configured to operate in a noncontiguous "80+80" operation mode, in which the RF unit RF_11 and RF_12 are designated to a primary frequency band BD_P and a secondary frequency band BD_S correspondingly. The primary frequency band BD_P and the secondary frequency band BD_S are noncontiguous frequency bands. The primary frequency band BD_P, carrying control messages/information, may be 20 MHz, 40 MHz or 80 MHz wide. The secondary frequency band BD_S, carrying data payload, is 80 MHz wide. In addition, the second wireless device 402 may comprise two RF units RF_21 and RF_22.

Under a condition that the first wireless device 400 is configured to operate in the noncontiguous 80+80 operation mode, in which the RF unit RF_11 and RF_12 are designated to the primary frequency band BD_P and the secondary frequency band BD_S, when the second wireless device 402 attempts to establish the wireless connection with the first wireless device 400 on the primary frequency band BD_P, the first wireless device 400 obtains the spatial capability of the second wireless device 402. The first wireless device 400 may receive the spatial capability from the second wireless device 402, or the first wireless device 400 determines the spatial capability of the second wireless device 402 by itself. After the first wireless device 400 obtains the spatial capability of the second wireless device 402, the first wireless device 400 checks if the second wireless device 402 is capable of receiving/successfully decoding two data streams packets. If yes, the first wireless device 400 transmits two data streams to the second wireless device 402 on the primary frequency band BD_P, implying that the first wireless device 400 re-designates both of the RF units RF_11-RF_12 to the primary frequency band BD_P.

Otherwise, the first wireless device 400 remains transmitting one data streams to the second wireless device 402 on the primary frequency band BD_P. In other words, the first wireless device 400 has flexibility of adjusting the number of spatial data streams transmitted on the primary frequency band BD_P to the second wireless device 402, and would not be restricted to transmit only one data stream one the primary frequency band BD_P.

Figure 5:
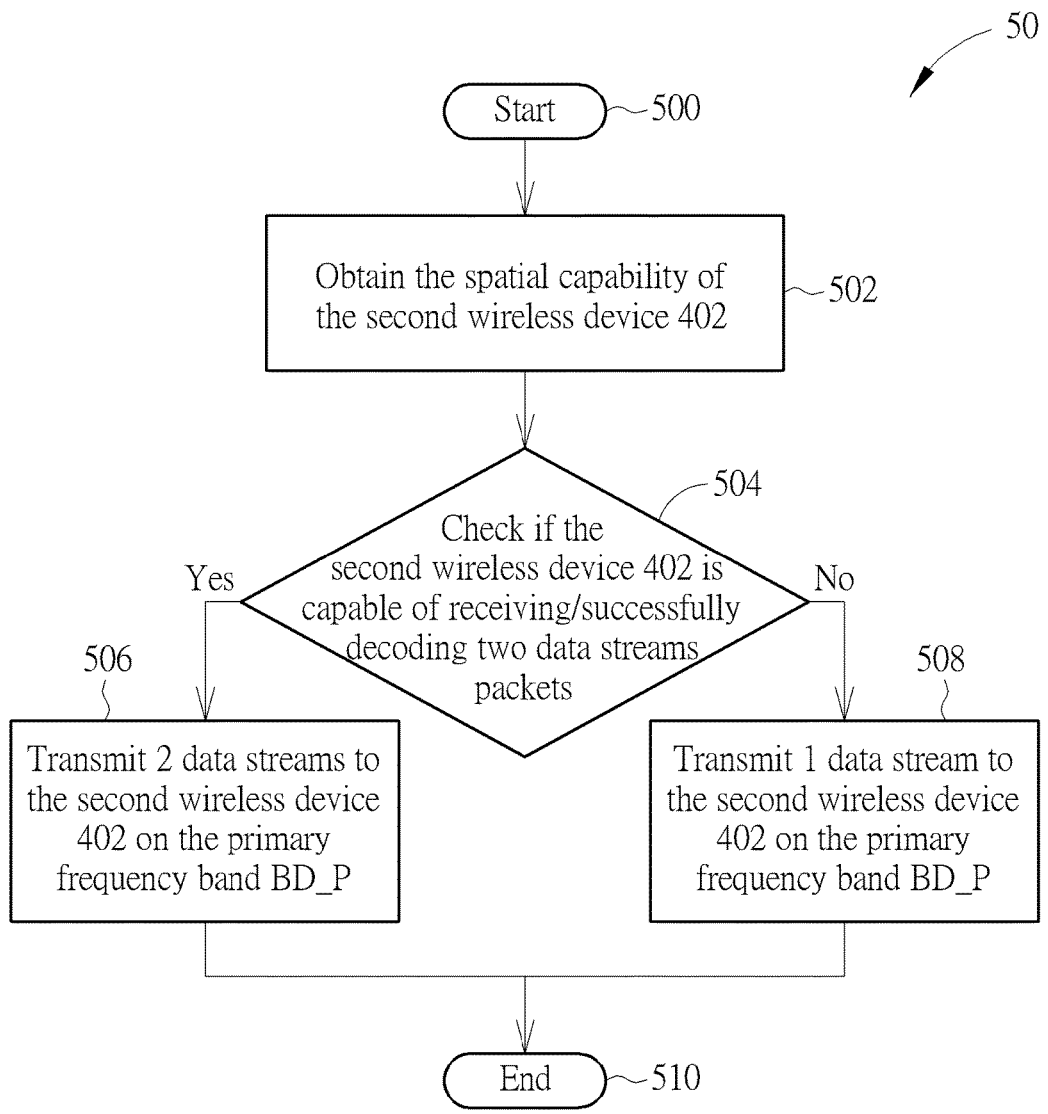
FIG. 5 is a schematic diagram of a configuring process according to an embodiment of the present invention.

Operations of the first wireless device 400 configuring number of transmission data streams may be further summarized into a configuring process 50. As FIG. 5 shows, the configuring process 50 comprises the following steps:

Step 500: Start.
Step 502: Obtain the spatial capability of the second wireless device 402.
Step 504: Check if the second wireless device 402 is capable of receiving/successfully decoding two data streams packets. If yes, go to Step 506; otherwise, go to Step 508.
Step 506: Transmit 2 data streams to the second wireless device 402 on the primary frequency band BD_P.
Step 508: Transmit 1 data stream to the second wireless device 402 on the primary frequency band BD_P.
Step 510: End.

Details of the configuring process 50 may be referred to related paragraphs stated in the above, which is not narrated herein for brevity. Notably, if the wireless device 400 determines that the wireless device 402 is capable of receiving/successfully decoding more data streams, according to the configuring process 50, the wireless device 400 would in additionally designates the RF unit RF_12 to the primary frequency band BD_P, such that the number of data streams transmitted on the primary frequency band BD_P is increased to 2, greater than the number of data streams on the primary frequency band BD_P in the noncontiguous mode.

Notably, in the embodiments stated in the above, in the noncontiguous operation mode, each frequency band is corresponding to one RF unit, which is not limited thereto. In other words, a number of the RF units included in the first wireless device is not limited to be a number of the operating frequency bands of the wireless communication system. The first wireless device may comprise more (or less) RF units. Furthermore, in the noncontiguous operation mode, the primary frequency band is not limited to carry only one data stream. A plurality of RF units of the first wireless device maybe designated to the primary frequency band, i.e., the primary frequency band is corresponding to at least one RF units of the first wireless device and carries more than one data streams. As long as the first wireless device in the noncontiguous operation mode re-designates more RF units to the primary frequency band, and the number of data streams transmitted on the primary frequency band is increased in the noncontiguous operation mode, requirements of the present invention is satisfied, which is within the scope of the present invention.

In summary, under the condition that the first wireless device operates in the noncontiguous operation mode, the present invention reserves the flexibility of transmitting multiple spatial data streams transmitted for the first wireless device to the second wireless device on the primary frequency band. The data rate between the first wireless device and the second wireless device is enhanced by fully utilizing all of the RF units thereof.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method of configuring transmission data streams, utilized in a first wireless device within a wireless communication system, the wireless communication system operating at a plurality of frequency bands in a noncontiguous operation mode, the first wireless device comprising a plurality of radio frequency (RF) units, the method comprising:
obtaining a spatial capability of a second wireless device;
determining a spatial capacity of a wireless connection between the first wireless device and the second wireless device according to the spatial capability; and
transmitting a plurality of data streams to the second wireless device at a first frequency band of the plurality of frequency bands, wherein a number of the plurality of data streams is greater than a first number and smaller than or equal to the spatial capacity, and the first number is a number of data streams on the first frequency band in the noncontiguous operation mode.

2. The method of claim 1, wherein the plurality of RF units are evenly corresponding to the plurality of frequency bands before receiving the spatial capability of the second wireless device, and a number of RF units corresponding to the first frequency band is the first number in the noncontiguous operation mode.

3. The method of claim 2, wherein the first wireless device transmits one data stream via one of the plurality of RF units at one of the plurality of frequency bands before obtaining the spatial capability of the second wireless device.

4. The method of claim 1, wherein the first wireless device determines the spatial capacity of the wireless connection as a minimum number of the spatial capability of the second wireless device and a number of the plurality of RF units of the first wireless device.

5. The method of claim 1, wherein the first frequency band is a primary band of the wireless communication system, and at least a packet transmitted at the primary band contains a control message of the wireless communication system.

6. The method of claim 1, wherein each of the plurality of RF units comprises an antenna.

7. The method of claim 1, wherein the plurality of frequency bands are all noncontiguous frequency bands.

8. The method of claim 1, wherein the spatial capability of the second wireless device is a maximum number of data streams which the second wireless device is capable to receive at one of the plurality of frequency bands.

9. A wireless communication system, operating at a plurality of frequency bands in a noncontiguous operation mode, the wireless communication system comprising:
a first wireless device, comprising a plurality of radio frequency (RF) units; and
a second wireless device, configured to establish a wireless connection with the first wireless device;
wherein the first wireless device obtains a spatial capability of a second wireless device and determines a spatial capacity of the wireless connection according to the spatial capability;
wherein the first wireless device transmits a plurality of data streams to the second wireless device at a first frequency band of the plurality of frequency bands, and a number of the plurality of data streams is greater than a first number and smaller than or equal to the spatial capacity, and the first number is a number of data streams on the first frequency band in the noncontiguous operation mode.

10. The system of claim 9, wherein the plurality of RF units are evenly corresponding to the plurality of frequency bands before the first wireless device receives the spatial capability of the second wireless device, and a number of RF units corresponding to the first frequency band is the first number in the noncontiguous operation mode.

11. The system of claim 10, wherein the first wireless device transmits one data stream via one of the plurality of RF units at one of the plurality of frequency bands before the first wireless device obtains the spatial capability of the second wireless device.

12. The system of claim 9, wherein the first wireless device determines the spatial capacity of the wireless connection as a minimum number of the spatial capability of the second wireless device and a number of the plurality of RF units of the first wireless device.

13. The system of claim 9, wherein the first frequency band is a primary band of the wireless communication system, and at least a packet transmitted at the primary band contains a control message of the wireless communication system.

14. The system of claim 9, wherein each of the plurality of RF unit comprises an antenna.

15. The system of claim 9, wherein the plurality of frequency bands are all noncontiguous frequency bands.

16. The system of claim 9, wherein the spatial capability of the second wireless device is a maximum number of data streams which the second wireless device is capable to receive at one of the plurality of frequency bands.

* * * * *